United States Patent
de Perthuis et al.

(10) Patent No.: US 11,503,591 B2
(45) Date of Patent: Nov. 15, 2022

(54) TRANSMISSION OF PAYLOAD BETWEEN A MOBILE DEVICE AND A PLURALITY OF ANCHOR DEVICES VIA RANGING-CAPABLE PHYSICAL LAYER COMMUNICATION

(71) Applicant: NXP B.V., Eindhoven (NL)

(72) Inventors: Hugues Jean Marie de Perthuis, Garcelles (FR); Frank Leong, Veldhoven (NL)

(73) Assignee: NXP B.V., Eindhoven (NL)

( * ) Notice: Subject to any disclaimer, the term of this patent is extended or adjusted under 35 U.S.C. 154(b) by 96 days.

(21) Appl. No.: 17/018,313

(22) Filed: Sep. 11, 2020

(65) Prior Publication Data

US 2021/0112548 A1 Apr. 15, 2021

(30) Foreign Application Priority Data

Oct. 11, 2019 (EP) ..................................... 19290102

(51) Int. Cl.
*H04W 72/04* (2009.01)
*H04W 56/00* (2009.01)

(52) U.S. Cl.
CPC ....... *H04W 72/0446* (2013.01); *H04W 56/00* (2013.01); *H04B 2201/71634* (2013.01)

(58) Field of Classification Search
CPC ................ G01S 13/765; H04B 1/7183; H04B 2201/71634; H04W 56/00; H04W 72/0446
See application file for complete search history.

(56) References Cited

U.S. PATENT DOCUMENTS 7,620,021 B1    11/2009 Chen
7,961,641 B1 *  6/2011  Choi .................... H04W 52/50
                                                    455/425

(Continued)

FOREIGN PATENT DOCUMENTS

CA    2778531 A1 *  4/2011 ........... H04L 5/0053
EP    3370464 A1    9/2018

OTHER PUBLICATIONS

IEEE 802.15.4-2015; IEEE Standard for Low-Rate Wireless Personal Area Networks (WPANS); Approved Dec. 5, 2015; Published Apr. 22, 2016.

(Continued)

*Primary Examiner* — Shah M Rahman

(57) ABSTRACT

A method is described for transmitting a payload between a mobile device and a plurality of anchor devices via a ranging-capable physical layer, in particular an ultra-wide band (UWB), communication. The method comprises: i) transmitting, by the mobile device, a first message to a first anchor device and to a second anchor device, wherein the first message comprises a synchronization protocol, ii) establishing, upon receiving the first message, a first time slot for the first anchor device and a second time slot for the second anchor device based on the synchronization protocol, iii) transmitting, by the mobile device, a second message to the first anchor device and/or to the second anchor device, wherein the second message comprises a mobile device payload, iv) transmitting, upon receiving the second message by the first anchor device, a third message to the mobile device during the first time slot by the first anchor device, wherein the third message comprises a target device payload, and/or v) transmitting, upon receiving the second message by the second anchor device, the third message to the mobile device during the second time slot by the second anchor device.

14 Claims, 2 Drawing Sheets

(56) References Cited

U.S. PATENT DOCUMENTS

| | | | | |
|---|---|---|---|---|
| 8,462,781 | B2* | 6/2013 | McGhee | H04L 43/028 370/392 |
| 9,848,421 | B2 | 12/2017 | Faurie | |
| 10,567,035 | B1* | 2/2020 | Torborg | H04W 56/001 |
| 2004/0143842 | A1* | 7/2004 | Joshi | H04W 48/08 725/62 |
| 2005/0201456 | A1* | 9/2005 | Lakkis | H04B 1/71637 375/232 |
| 2006/0172738 | A1* | 8/2006 | Kwon | H04W 36/125 455/439 |
| 2010/0254279 | A1* | 10/2010 | Choi | H04L 43/0894 370/252 |
| 2014/0010143 | A1* | 1/2014 | Barrett | H04B 7/15592 370/312 |
| 2015/0036540 | A1* | 2/2015 | Kasslin | H04W 48/16 370/254 |
| 2017/0135063 | A1* | 5/2017 | Bartov | H04W 56/0015 |
| 2017/0238135 | A1* | 8/2017 | Vamaraju | H04W 4/023 455/456.1 |
| 2018/0139679 | A1* | 5/2018 | Åström et al. | H04W 48/16 |
| 2018/0254870 | A1* | 9/2018 | Dutz | H04B 7/0604 |
| 2018/0254910 | A1* | 9/2018 | Dutz | H04W 12/041 |
| 2018/0309660 | A1* | 10/2018 | Loehr | H04L 1/08 |
| 2019/0013937 | A1 | 1/2019 | Leong et al. | |
| 2019/0135229 | A1* | 5/2019 | Ledvina | H04W 4/40 |
| 2019/0349962 | A1* | 11/2019 | Kim | H04W 72/04 |
| 2021/0068120 | A1* | 3/2021 | Jung | H04L 1/1812 |

OTHER PUBLICATIONS

IEEE 802.15.8-2017; IEEE Standard for Wireless Medium Access Control (MAC) and Physical Layer (PHY) Specifications for Peer Aware Communications (PAC); Approved Dec. 6, 2017; Published Feb. 7, 2018.

Conti, Massimo et al.; "Performance Analysis of an Indoor and Outdoor Real Time Localization System;" 2019 IEEE 23rd International Symposium on Consumer Technologies (ISCT); June 19-21, 1029; Ancona, Italy; DOI: 10.1109/ISCE.2019.8901010.

* cited by examiner

TRANSMISSION OF PAYLOAD BETWEEN A MOBILE DEVICE AND A PLURALITY OF ANCHOR DEVICES VIA RANGING-CAPABLE PHYSICAL LAYER COMMUNICATION

CROSS-REFERENCE TO RELATED APPLICATIONS

This application claims priority under 35 U.S.C. § 119 to European Patent Application No. 19290102.3, filed on Oct. 11, 2019, the contents of which are incorporated by reference herein.

FIELD OF THE INVENTION

The invention relates to a method of transmitting a payload between a mobile device and a plurality of anchor devices. The invention relates further to a system that comprises the mobile device and the plurality of anchor devices.

BACKGROUND OF THE INVENTION

Radio frequency (RF) ranging systems can be used for measuring the range (distance) between objects, for example between a tag (such as a mobile phone or a key) and one or more anchor (e.g. a beacon). These ranging systems can be based on Time-of-Flight (ToF) principles to determine the distance between the anchors and the tag. For example, a transmitter of a first transceiver sends out a waveform (e.g. a chirp or a pulse), which is then either reflected by an object or re-transmitted by a second transceiver. Based on the amount of time that it takes for the reflection or re-transmission to reach the receiver of the first transceiver, the distance between the objects (and hence the position) can be calculated. In another implementation, the angle of arrival can be calculated.

In scenarios, such as car access, to ensure that ranging is always successful whatever the direction the user is coming from, multiple anchors will be used, e.g. at every edge of the car, on the roof, etc., to ensure that the anchors have an accurate ranging despite blind spots of individual anchor devices and interferences. If multiple objects (e.g. several anchors) are involved in the measurements, methods such as triangulation/trilateration can be used to accurately calculate the position of the tag. The distance or position between several devices can be used as a control in many applications.

While the systems described above are used for RF ranging (position determination), the transmission of a payload (e.g. authentication information, key credentials, transaction data) between a mobile device and a plurality of anchor devices (associated with a payload target device) remains a challenge. Transferring a payload between a mobile device and (an anchor device of) a target device requires on the one hand a secure communication (e.g. because sensitive authorization data are transferred), but on the other hand, a robust and cost-efficient technology is desired (in particular because e.g. keyfobs are a mass product for a mass market). Further, in a system comprising a plurality of anchor devices, it may be a complex task to decide, which anchor devices should be used and how to organize them efficiently.

OBJECT AND SUMMARY OF THE INVENTION

It is an object of the invention to provide a transmission of payload between a mobile device and a plurality of anchor devices via an RF communication in an efficient and robust manner.

In order to achieve the object defined above, a method and a system according to the independent claims are provided.

According to an exemplary embodiment of the invention, a method is described for transmitting a payload (e.g. authentication information) between a mobile device and a plurality (two or more) of anchor devices (in particular associated with a payload target device such as a car) via a ranging-capable physical layer, in particular an ultra-wide band (UWB), (facilitating ToF ranging and data communications) communication (channel). The method comprises: i) transmitting (by the mobile device) a first message to a first anchor device and to a second anchor device (of the plurality of anchor devices), wherein the first message comprises a synchronization protocol (for establishing a time slot system, in particular a time slot system comprising two or more rounds), ii) establishing, upon receiving the first message (by the first anchor device and by the second anchor device), a first time slot for the first anchor device (to transmit a message to the mobile device) and a second time slot for the second anchor device (to transmit a message to the mobile device) based on the synchronization protocol, iii) transmitting (by the mobile device) a second message to the first anchor device and/or to the second anchor device, wherein the second message comprises a mobile device payload, iv) transmitting (upon receiving the second message by the first anchor device) a (first) third message to the mobile device in the first time slot by the first anchor device, wherein the third message comprises a target device payload, and/or v) transmitting (upon receiving the second message) by the second anchor device, the (second) third message to the mobile device in the second time slot by the second anchor device.

According to a further exemplary embodiment of the invention, a (communication) system is described for transmitting a payload over a ranging-capable physical layer (in particular an ultra-wide band (UWB)) communication. The system comprises: i) a mobile device, ii) a first anchor device (in particular arranged at a payload target device (e.g. a car)), and iii) a second anchor device (in particular arranged at the payload target device (more in particular at another location as the first anchor device)). The mobile device is configured for: a) transmitting a first message to the first anchor device and to the second anchor device, wherein the first message comprises a synchronization protocol, and b) transmitting a second message to the first anchor device and/or to the second anchor device, wherein the second message comprises a mobile device payload. Each anchor device is configured for: c) establishing, upon receiving the first message, a first time slot for the first anchor device and a second time slot for the second anchor device based on the synchronization protocol, d) transmitting a (first) third message by the first anchor device to the mobile device during the first time slot, wherein the third message comprises a target device payload, and/or e) transmitting the (second) third message by the second anchor device to the mobile device during the second time slot.

According to a further aspect of the invention, it is described to use a ranging-capable physical layer (in particular an ultra-wide band (UWB))-based ranging system between a mobile device and a plurality of anchor devices as a payload transmission system. In particular, wherein only the anchor devices (more in particular only one anchor device) are applied that fulfill a ranging-capable physical layer (in particular an UWB) communication quality criterion.

In the context of the present application, the term "mobile device" may refer to any electric device that is portable and may establish an UWB connection to anchor devices. A mobile device may for example be a mobile phone, a tag, a token, a key, or a keyfob.

In the context of the present application, the term "anchor device" may refer to any electric device that can be associated (e.g. arranged at or coupled to) with a target device and that may communicate with a mobile device via ranging-capable physical layer communication such as UWB. An anchor device may also be termed e.g. a beacon, a node, or a marker. An anchor device may be an unidirectional or a bidirectional communication device.

In the context of the present application, the term "synchronization protocol" may refer to a protocol that comprises information and/or commands for establishing a synchronization (system). In an embodiment, the synchronization protocol may be transmitted as synchronization signals. In a preferred embodiment, the synchronization may comprise establishing time slots (for transmitting messages) for a plurality of anchor devices, so that a time slot is assigned to each anchor device. In this manner, the anchor devices may transmit their messages one after the other. The synchronization system may comprise two or more rounds, wherein each anchor device comprises one time slot in each round.

In the context of the present application, the term "target device" may refer to any device that can be associated with anchor devices. In an embodiment, an authorization may be needed to access the target device. In another embodiment, the target device may be a car and a target device payload may comprise authentication information to open the car. In another embodiment, the target device may be a door (e.g. of an office or a hotel) and a target device payload may comprise authentication to open the door. In a further embodiment, the target device may be in a transit area, and the payload may comprise buying a ticket.

In the context of the present application, the term "payload" may refer to the part of transmitted data (e.g. a message) that is the actual intended message. Headers and metadata may for example not be payload but are sent to enable payload delivery. In an embodiment, payload may comprise authentication information, key credentials, transaction data, etc.

In the context of the present application, the term "message" may refer to data that is transferred between electric devices such as a mobile device and anchor device(s). A message may be a packet or a frame. According to an example, a first message may include e.g. a synchronization protocol, a second message (from a mobile device) may include a mobile device payload (e.g. authentication data), and a third message (from a plurality of anchor devices) may include target device (or anchor device) payload. In an example, the second message may be transmitted before the third message. In another example, the (plurality of) third message may be transmitted before the second message.

In the context of the present application, the term "ranging-capable physical layer communication" may refer to any physical layer communication that could be applied to (e.g. Time-of-Flight) ranging, for example: WiFi ranging (e.g. at 2.4 GHz, but also 5 GHz and 60 GHz), Bluetooth (e.g. BLE HADM (Bluetooth Low Energy High Accuracy Distance Measurement)) ranging, ranging using VLC (Visible Light Communication), Terahertz (e.g. >100 GHz) communications, and ultra-wide band communication (UWB). The physical layer may be defined as the first layer of the Open System Interconnection Model (OSI Model). In general, a physical layer may deal with bit-level transmission between different devices and supports electrical or mechanical interfaces connecting to the physical medium for synchronized communication.

In the context of the present application, the term "ultra-wide band communication" (or ultra-wideband) may refer to a radio technology that can use a very low energy level for short-range, high-bandwidth communications over a large portion of the radio spectrum. UWB may refer to a technology for transmitting information spread over a large bandwidth (>500 MHz). UWB may be defined as an antenna transmission for which emitted signal bandwidth exceeds the lesser of 500 MHz or 20% of the arithmetic center frequency. UWB transmissions may transmit information by generating radio energy at specific time intervals and occupying a large bandwidth, thus enabling pulse-position or time modulation. The range of UWB may be for example in the range of $10^{th}$ of meters. An UWB (RF) ranging system may employ the Time-of-Flight principle to determine the distance between a mobile device and a target device (e.g. a car to be opened) and/or anchor devices (markers) on the target device. Usually, a transceiver's transmitter sends out a waveform, commonly a chirp or a pulse, which is either reflected by an object or retransmitted by a second transceiver. Based on the amount of time it takes for the reflection or retransmission to reach the originating transceiver's receiver, the distance between the objects can be calculated. The so determined range between the receiver and the transmitter is then used as a control point (to enable access). In the same manner, payload may be transferred using UWB.

According to an exemplary embodiment, the invention may be based on the idea that a transfer of payload between a mobile device and a plurality of anchor devices (that are associated with a payload target device) can be established in an efficient and robust manner, when a ranging-capable physical layer communication (in particular an ultra-wide band communication) (connection) between the devices is applied and a synchronization protocol with time slots (e.g. from ranging systems) is used. Transferring a payload between a mobile device and (an anchor device of) a target device requires on the one hand a secure communication (e.g. because sensitive authorization data are transferred), but on the other hand, a robust and cost-efficient technology is desired (in particular because e.g. keyfobs are a mass product for a mass market). Further, in a system comprising a plurality of anchor devices, it may be a complex task to decide, which anchor devices should be used and how to organize them efficiently. It has now been surprisingly found that ultra-wide band is a robust and secure tool to transfer payload between a mobile device and a plurality of anchor devices, wherein the transmission of the anchor devices is organized as a time slot system. For example, only those anchor devices with a high-quality (e.g. UWB) communication channel may be used. In another example, the transmission may be stopped after one high-quality message from a specific anchor device has been received by the mobile device. Therefore, the transmission of payload may be realized in an efficient and robust manner. It may be ensured that payload is correctly exchanged between a mobile device and an anchor device system. The described method may be easy to implement, for example by re-using existing RF ranging systems. Furthermore, the interference with other systems may be minimized and the power needed by the mobile device may be reduced.

In the following, further exemplary embodiments of the method and the communication system will be explained.

According to an exemplary embodiment, the method further comprises: i) transmitting a first control message (by the first anchor device) to a control unit (associated with the target device), and/or ii) transmitting a second control message (by the second anchor device) to the control unit. According to a further exemplary embodiment, the method further comprises: iii) transmitting (upon receiving the first control message by the control unit), a first reply message to the first anchor device (by the control unit), and/or iv) transmitting (upon receiving the second control message, by the control unit) a second reply message to the second anchor device (by the control unit). This may provide the advantage that the mobile device and anchor device system is in contact with the target device (with the control unit as an interconnection device).

In the context of the present application, the term "control unit" may refer to a unit that is associated (e.g. arranged at or coupled to) with the payload target device. In a basic embodiment, the control unit may be a microprocessor. In another embodiment, the control unit may be the body control module (BCM) of a car. In a further embodiment, the control unit may be the control system of a door or a transaction device. The control unit may be an interconnection between the plurality of anchor devices and the target device.

In an embodiment, the target device payload may be transferred from the control unit to the anchor devices. Each anchor device may transmit a control message to the control unit, wherein the control message comprises e.g. information about the mobile device and/or at least partially the second message from the mobile device. Upon receiving the control messages, the control unit may send a reply message to each anchor device, wherein the reply message may comprise e.g. information for the mobile device, commands to the anchor devices, and/or at least partially the third message.

According to a further exemplary embodiment, the method further comprises: removing (by the control unit) the second control message of the second anchor device, when said second control message is a duplicate (essentially identical) of the first control message from the first anchor device. This may provide the advantage that the data transfer is efficiently organized.

In an exemplary embodiment, all of the anchor devices receive the packet (message) from the mobile device. If an anchor device receives the message, it may check its integrity (e.g. by cyclic redundancy check (CRC) or the one provided by the message (packet) encryption). If the (first and/or second) message has been correctly received, the anchor devices may transmit it (as a control message) to the (central) control unit (e.g. a BCM in a car). Depending on the communication quality, the control unit may receive multiple time the same (control) message from the plurality of anchor devices. Hence, the control unit may remove duplicates. Then, the control unit may transmit its reply message to all anchor devices or only to those anchor devices whose control message has not been a duplicate.

According to a further exemplary embodiment, the method further comprises: i) testing (by the control unit) if the ranging-capable physical layer (UWB) communication of the first anchor device and/or the second anchor device fulfills a control unit quality criterion, and ii) not transmitting (if the ranging-capable physical layer (UWB) communication to the first anchor device and/or the second anchor device (respectively) does not fulfill the control unit quality criterion) the reply message (by the control unit) to the first anchor device and/or the second anchor device (respectively). This may provide the advantage, that only those control messages that have been received by the control unit with high quality are answered. This may reduce error and additional effort.

In an exemplary embodiment, the anchor devices may transmit to the control unit information (e.g. in the control message) about their reception quality with respect to the mobile device. The control unit may select a control unit quality criterion (e.g. a threshold) under which it may be useless to transmit or directly select which anchors should answer. Thus, it may be ensured that only these (or only one) anchor devices with highest reception quality will transmit.

According to a further exemplary embodiment, the method further comprises: removing (by the mobile device) the (second) third message of the second anchor device, when said third message is a duplicate of the (first) third message of the first anchor device. This may provide the advantage that the data transfer is efficiently organized.

According to a further exemplary embodiment, the method further comprises: i) testing (by the mobile device) if the (first) third message of the first anchor device fulfills a mobile device quality criterion, and ii) rejecting (if the third message of the first anchor device fulfills the quality criterion) the (second) third message from the second anchor device. This may also provide the advantage that the data transfer is efficiently organized.

According to an example, once the mobile device has received a (third) message (during one round), it may avoid listening (until next round) as there may be no advantage to receive the same message again. According to a further example, when the mobile device receives (third) messages from one or more anchor devices with a very high quality, it may decide to listen only to this/these one/ones, while received signal quality is high enough (or a small number >1, to ensure a minimum level of redundancy, for example to minimize impact of sudden appearance of an interferer).

According to a further exemplary embodiment, the method further comprises: i) testing (by the first anchor device and/or by the second anchor device (respectively)) if the first message has been received, and ii) not transmitting (if the first anchor device and/or the second anchor device did not receive the first message) the (first and/or second) third message by the first anchor device and/or the second anchor device (respectively).

In an embodiment, if an anchor device does not receive a message (frame) from the mobile device, it is quite unlikely that the anchor device response may be received by the mobile device. Hence, in that case, the anchor device may avoid repeating the reply message from the control unit to the mobile device.

According to a further exemplary embodiment, the method further comprises: i) testing (by the first anchor device and/or by the second anchor device) if the ranging-capable physical layer (UWB) communication fulfills a anchor device quality criterion, and ii) not transmitting (if the ranging-capable physical layer (UWB) communication to the first anchor device and/or the second anchor device does not fulfill the anchor device quality criterion) the (first and/or second) third message by the first anchor device and/or the second anchor device (respectively).

According to an embodiment, if an anchor device receives a message, but can estimate that the communication channel is of low quality and that it is unlikely that the mobile device may receive the answer (possibly as it will have received information about its reception performance during session set-up), the anchor device may decide to avoid transmitting.

According to a further exemplary embodiment, the third message from each anchor device to the mobile device is essentially identical. This may provide the advantage that a very easy implementation is enabled.

According to a further exemplary embodiment, the (first) third message from the first anchor device comprises a first part of the third message, and the (second) third message from the second anchor device comprises a second part of the third message. This may provide the advantage that also long messages can be transferred in a reliable manner (in one and the same round).

In an embodiment, the communication can be of very high quality and different parts of a message can be transmitted in the same round (e.g. for long messages). For example, a link layer may be used that indicates a sequence number to assist duplicate removal. For example, anchor devices 1, 3, 5 might transmit a first part of a message and anchor devices 2, 4, 6 might transmit a second part.

According to a further exemplary embodiment, the method further comprises: i) measuring the distance (ranging) between the mobile device and the first anchor device, and/or ii) measuring the distance between the mobile device and the second anchor device. This may provide the advantage that the security and reliability can be improved. This may be done without further effort, because the payload transfer may be implemented into a ranging system. The range information may still be used to determine the position of the mobile device and thereby increase the security and communication quality.

According to a further exemplary embodiment, the mobile device is at least one of the group consisting of a mobile phone, a tag, a token, a key, a keyfob, a smart card. This may provide the advantage that general devices from daily life can be directly applied for the described method.

According to a further exemplary embodiment, the payload target device is at least one of the group consisting of a car, a door, a transaction terminal, a transit gate. This may provide the advantage that the described method can be implemented into a plurality of important applications that require authentication.

According to a further exemplary embodiment, access to the target device is granted, if the transmission of mobile device payload and target device payload via ranging-capable physical layer communication (such as UWB) has been successful.

The aspects defined above and further aspects of the invention are apparent from the examples of embodiment to be described hereinafter and are explained with reference to these examples of embodiment. The invention will be described in more detail hereinafter with reference to examples of embodiment but to which the invention is not limited.

BRIEF DESCRIPTION OF THE DRAWINGS

The illustrations in the drawings are schematic. In different drawings, similar or identical elements are provided with the same reference signs.

DESCRIPTION OF EXEMPLARY EMBODIMENTS

Figure 1:
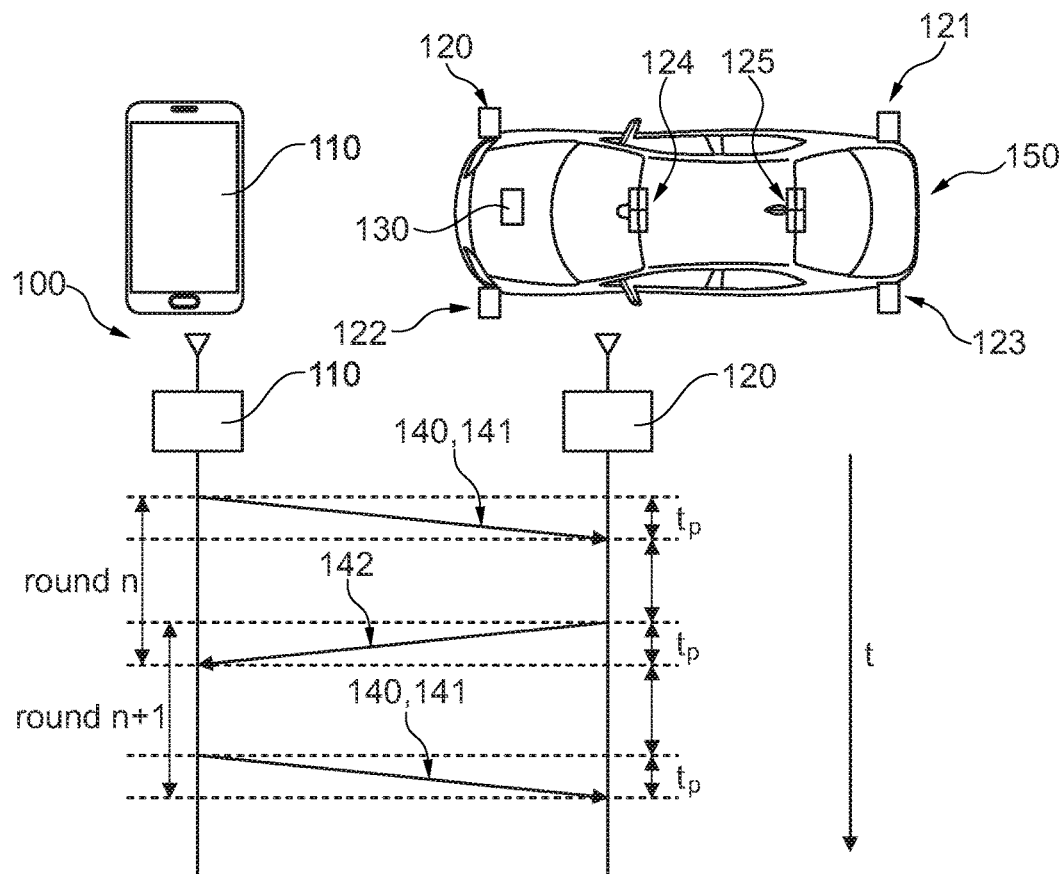
FIG. 1 illustrates a ranging-capable physical layer communication system according to an exemplary embodiment of the invention.

Before, referring to the drawings, exemplary embodiments will be described in further detail, some basic considerations will be summarized based on which exemplary embodiments of the invention have been developed.

According to an exemplary embodiment of the invention, the same RF channel, in particular UWB, which is used for ranging, can also be used to transmit payload (e.g. authentication information to open a hotel door, an office door, or transaction information to pay for a fare in a transit system). The RF ranging can complement current system based on RFID with a mobile device being used to perform card emulation over UWB. The RF ranging and payload transmission can be used in personal systems such as keyless car access or home access control. It can further also be used at a larger scale for scenarios such as control access system, e.g. for hotel or office buildings, or for transit system. Ideally, only the anchor device with highest communication quality is used for payload exchange with the mobile device.

According to a further exemplary embodiment of the invention, in an RF (in particular UWB) ranging system (e.g. position determination for keyless car access), the following steps are performed:

i) A mobile device (e.g. a keyfob or a mobile phone) is awakened to start a ranging session. This wake-up can be based on a radio signal, on geofencing, or on sensor fusion. The mobile device will then initiate a session with the target device (e.g. a car). This can be done via an out-of-band channel (OOB), e.g. Bluetooth low energy (BLE). Parameters for the session such as key materials and RF configurations will be exchanged.

ii) The mobile device and the anchor devices will perform continuous ranging. As there will be multiple anchor devices, the mobile device and the anchor devices will communicate via a time-slot system, e.g. the mobile device will send a synchronization protocol (synchronization signals) on which the anchor devices will synchronize. Then, the mobile device and the anchor devices will have allocated time-slots to transmit its messages (packets) according to a configuration agreed during the session setup. After a few slots, e.g. 16 of them, a new "ranging round" (i.e., a set of messages allowing ranging between the mobile device and each of the anchor devices) will start again with the mobile device sending a new synchronization protocol.

iii) Once the mobile device is reaching or about to reach a trigger area, i.e. an area where a transaction can start as the distance measured via the time of flight of the UWB messages, a transaction (of payload) will start. Transaction (of payload) will be performed over the same RF channel (UWB) and the mobile device and the anchor devices will exchange messages, like what would be exchanged over e.g. NFC.

According to a further exemplary embodiment of the invention, when payload transfer is started, the system will switch to its payload transfer configuration. The switching will be controlled either by the mobile device or the anchor devices. Transmission is done together with Time-of-Flight measurements. According to an exemplary example:

i) The mobile device will transmit at its dedicated transmit time-slot a packet (message) with the payload encapsulated into a link layer, wherein the link layer includes a sequence number.

ii) All anchor devices will receive the mobile device transmission. If an anchor device receives the packet, it will check its integrity, e.g. by CRC or the one provided by the packet encryption. If the packet was correctly received, the anchor devices will transmit it to the (central) control unit, e.g. a BCM in a car. Depending on the link quality, the BCM might receive multiple time same message from anchors. It will remove duplicates.

iii) Then, the BCM will transmit its reply to all anchor devices.

iv) The anchor devices will transmit the reply to the mobile device. If there is no payload to transmit, a dummy answer might be transmitted. Each anchor will transmit same payload to mobile device during its own dedicated time-slot. The mobile device will receive from each anchor device the same message. Depending on the anchor device, the message might be complete, or corrupted or missing. Integrity can be checked via CRC or via the encryption integrity protection.

v) Then, the mobile device removes duplicate messages.

According to exemplary embodiments of the invention, it is possible to further reduce the usage of RF (transmission):

i) If an anchor device does not receive a frame from the mobile device, it is quite unlikely the anchor device response will be received by the mobile device. Hence in that case, the anchor device will avoid repeating the message from the control unit (BCM).

ii) If an anchor device receives a message, but can estimate that the link channel is poor and that it is unlikely that the mobile device will receive the answer (possibly as it will have received info about its reception performance during session setup), the anchor device might decide to avoid transmitting.

iii) Anchor devices might transmit to the control unit information about their reception quality of the mobile device. The control unit might then select a threshold under which it is useless to transmit or directly select which anchors should answer to ensure that for instance only the two anchor devices with highest reception quality will transmit (in this case the "ranging round" will be shortened, where only the first reply time slots are used by the anchor devices that are assigned to be active).

iv) Once the mobile device has received a message during one round, it might avoid listening until the next round as there is no advantage to receive the same message again.

v) When the mobile device receives messages from one or more anchor devices with a very high quality, it might decide to listen only to this one while received signal quality is high enough (or a small number >1, to ensure a minimum level of redundancy, for example to minimize impact of sudden appearance of an interferer).

vi) For a simple implementation, within a ranging round, all message from anchor device to mobile device will be the same. However, link format can be such as in very good conditions, different part of message can be transmitted in same round (e.g. for long messages). In that case it will be up to the link layer to indicate a sequence number to help with duplicate removal. For instance, anchor 0, 2, 4 might transmit part 0 of message and anchors 1, 3, 5 might transmit part 1.

According to an exemplary embodiment, an advantage of the described method is that it is very easy to implement. A static frame structure can be used, and every anchor device can receive and transmit the same message. A BCM (control unit) can merge (or delete) received message(s) from anchor device(s). The same packet (message) structure can always be used, thereby avoiding complex implementation to select which anchor device should answer.

FIG. 1 illustrates a ranging-capable physical layer ranging (in particular UWB) communication system 100 according to an exemplary embodiment of the invention. The communication system 100 comprises a mobile device 110 (e.g. a mobile phone or a key) configured as a first transceiver and a plurality of anchor devices 120 to 125 configured as second transceivers. The anchor devices 120-125 are arranged at different positions of a payload target device 150, which is in the present example a car. Hereby, the anchor devices 120-125 are positioned at the four edges of the car 150 and on the roof. In the graph below, the communication between the mobile device 110 and one anchor device 120 of the plurality of anchor devices 120-125 is shown. The same graph can be applied to the other anchor devices 121-125. During one round n, the mobile device 110 sends a synchronization protocol in order to establish a time slot system and thereby synchronize the plurality of anchor devices 120-125. The mobile device 110 transmits also a second message 141 to the anchor device 120, including mobile device payload. The anchor device 120 transmits a third message 142 that includes target device payload. The same transmission is repeated in the second round n+1.

Figure 2:
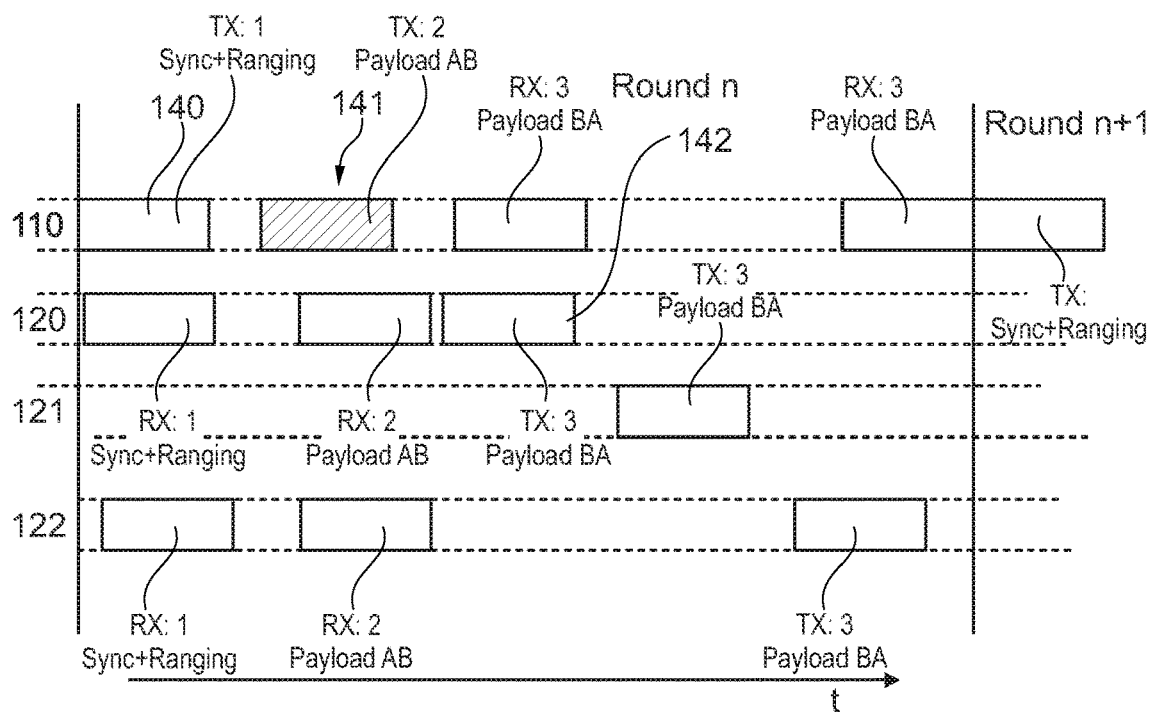
FIG. 2 illustrates a ranging-capable physical layer communication organized as a time slot system according to an exemplary embodiment of the invention.

FIG. 2 illustrates a detailed example of a ranging-capable physical layer (such as UWB) communication between the mobile device 110 and the plurality of anchor devices 120 to 122. The mobile device 110 establishes an ultra-wide band communication channel with the plurality of anchor devices 120-122. Then, the mobile device 110 transmits (TX1) a first message (sync+ranging) 141 to each anchor device 120 to 122, wherein the message comprises a synchronization protocol (and optionally a ranging session initiation). The synchronization protocol assigns a first time slot Ito anchor device 120, a second time slot to anchor device 121, and a third time slot to anchor device 121 (the duration of a time slot is e.g. around 1 ms). While the first anchor device 120 and the third anchor device 122 receive (RX1) the first message 141, the second anchor device 121 does not receive said message, e.g. due to a low quality communication link. The mobile device 110 transmits (TX2) a second message 142 to the plurality of anchor devices 120-122, wherein the second message 142 comprises a mobile device payload. The mobile device 110 is hereby the first transceiver A, while the anchor devices 120-122 represent the second transceiver B. While the first anchor device 120 and the third anchor device 122 receive (RX2) the second message 142 from the mobile device 110, the second anchor device 121 does not receive said message, e.g. due to a low quality communication link or by rejecting further transmission based on detection of the low quality communication. The anchor devices 120-122 transmit the payload to a control unit 130 and receive a reply from the control unit 130 (not shown). Then, the first anchor device 120 and the third anchor device 122 transmit (TX3) a respective third message 143 to the mobile device 110, wherein the third message 143 comprises target device payload information (from the control unit 130). Because different time slots have been assigned (using the synchronization protocol) to the anchor devices 120-122, the first anchor device 120 transmits the third message during the first time slot and the third anchor device 123 transmits the third message 143 during the third time slot. The second anchor device 121 will not transmit during the second time slot, due to low quality communication. The mobile device 110, in turn, receives (RX3) the third message 143 during the first time slot and again during the third time slot. As the third message 143 is the same in both cases, the mobile device 110 will discard the second one. Alternatively, the mobile device 110 blocks receiving further messages after the third message 143 has been received successfully for the first time. Based on the transmission of the payloads over the UWB communication channel, an authorization can be performed, for example access to the target device 150 is granted.

Figure 3:
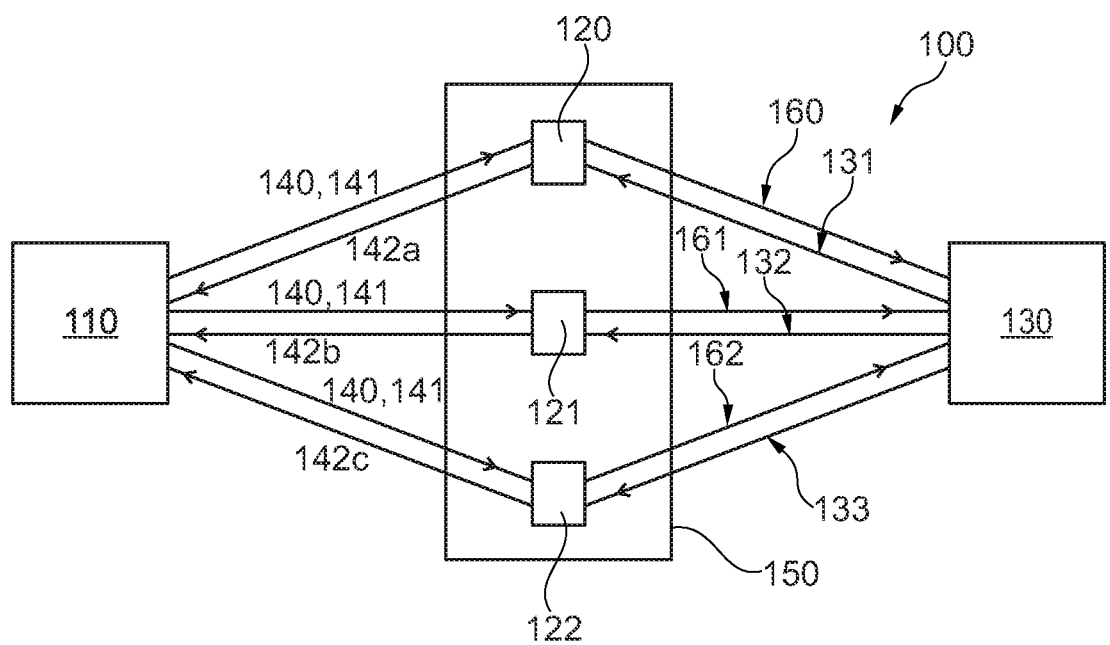
FIG. 3 illustrates a further ranging-capable physical layer communication system according to an exemplary embodiment of the invention.

FIG. 3 illustrates a communication system 100 as described above for FIG. 1 with a mobile device 110 and a plurality of anchor devices 120-122. The anchor devices 120-122 are arranged at a payload target device 150, e.g. a car. The target device 150 is associated (coupled) with a control unit 130, e.g. a BCM. Each anchor device 120-122 transmits a respective control message 160-162 to the control unit 130, wherein the control messages 160-162 are essentially similar and comprise information about the mobile device and/or the second message 141 from the mobile device 110. Upon receiving the respective control messages 160-162, the control unit 130 sends respective reply messages 131-133 to each of the anchor devices 120-122, wherein the reply messages 131-133 comprise target device payload. Each of the anchor devices 120-122 transmits a respective third message 142a, 142b, 142c, which comprises the target device payload, to the mobile device 110. By performing this communication, access to the target device 150 may be allowed based on the transferred payload.

Figure 4:
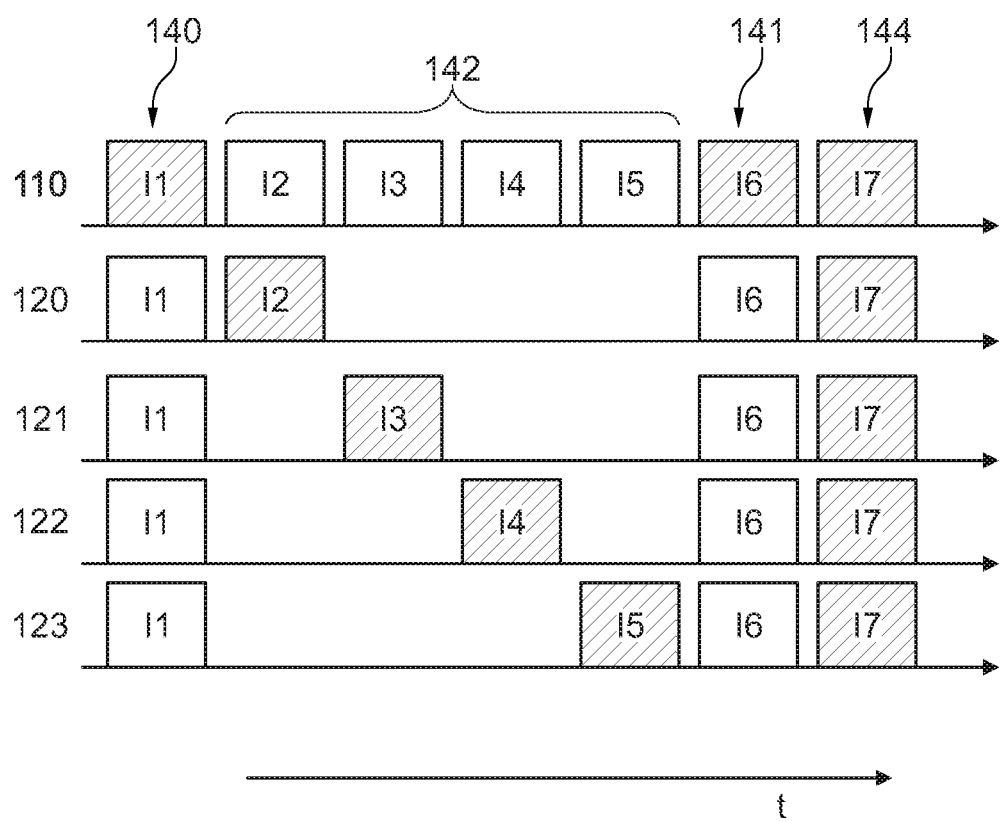
FIG. 4 illustrates a time slot system established by a synchronization protocol according to an exemplary embodiment of the invention.

FIG. 4 illustrates a time slot system that is established by the synchronization protocol in a communication system 100 with the mobile device 110 and four anchor devices 120-123. FIG. 4 shows one round n, even though the system may comprise many rounds. In time slot I1, the mobile device 110 sends a first message 140, which is received by every anchor device 120-123. Then, every anchor device 120-123 replies in its allocated time slot (I2 to I5) with a respective third message that comprises target device payload. Then, the mobile device 110 sends again a second message in 16, containing mobile device payload. In an optional time slot 17, all devices send the payload to the (control unit of the) target device (e.g. a car) 150. While this principle can be used to determine the range (distance, position) between a mobile device 110 and anchor devices 120-122 (wherein the result may be further communicated to a control unit/target device), it can also be applied efficiently to transfer payload.

REFERENCE NUMERALS

100 Communication system
110 Mobile device
120-125 Anchor devices
130 Control unit
131-132 Reply messages
140 First message
141 Second message
142 Third message
142a-c Third messages
144 Message to control unit
150 Payload target device, car
160-162 Control messages
t Time

The invention claimed is:

1. A method for transmitting a payload between a mobile device and a plurality of anchor devices via a ranging-capable physical layer communication, the method comprising:

transmitting, by the mobile device, a first message to a first anchor device and to a second anchor device, wherein the first message comprises a synchronization protocol, wherein the synchronization protocol comprises information and/or commands for establishing a synchronization for establishing time slots for transmitting messages by the plurality of anchor devices;

establishing, upon receiving the first message, a first time slot for the first anchor device and a second time slot for the second anchor device based on the synchronization protocol;

transmitting, by the mobile device, a second message to the first anchor device and/or to the second anchor device, wherein the second message comprises a mobile device payload;

transmitting, by the first anchor device, a third message to the mobile device during the first time slot by the first anchor device, wherein the third message comprises a target device payload for a device associated with the plurality of anchor devices; and transmitting, by the second anchor device, the third message comprising the target device payload to the mobile device during the second time slot by the second anchor device;

testing based on received messages, by a control unit, if the ranging capable physical layer communication of the first anchor device and/or the second anchor device fulfills a control unit quality criterion; and not transmitting, if the ranging-capable physical layer communication to the first anchor device and/or the second anchor device does not fulfill the control unit quality criterion, reply message by the control unit to the first anchor device and/or the second anchor device.

2. The method according to claim 1, further comprising:

transmitting a first control message, by the first anchor device, to a control unit; and/or transmitting a second control message, by the second anchor device, to the control unit; and transmitting, upon receiving the first control message, by the control unit, a first reply message to the first anchor device; and/or transmitting, upon receiving the second control message, by the control unit, a second reply message to the second anchor device.

3. The method according to claim 2, further comprising:

removing, by the control unit, the second control message of the second anchor device, when said second control message is a duplicate of the first control message from the first anchor device.

4. The method according to claim 1, further comprising:

removing, by the mobile device, the third message of the second anchor device, when said third message is a duplicate of the third message of the first anchor device.

5. The method according to claim 1, further comprising:

testing, by the mobile device, if the third message of the first anchor device fulfills a quality criterion; and rejecting, if the third message of the first anchor device fulfills the quality criterion, the third message from the second anchor device.

6. The method according to claim 1, further comprising:

testing, by the first anchor device and/or by the second anchor device, if the first message has been received; and not transmitting, if the first anchor device and/or the second anchor device did not receive the first message, the third message by the first anchor device and/or the second anchor device.

7. The method according to claim 1, further comprising:
testing, by the first anchor device and/or by the second anchor device, if the ranging-capable physical layer communication fulfills a quality criterion; and
not transmitting, if the ranging-capable physical layer communication to the first anchor device and/or the second anchor device does not fulfill the quality criterion, the third message by the first anchor device and/or the second anchor device.

8. The method according to claim 1,
wherein the third message from the first anchor device comprises a first part of the third message, and
wherein the third message from the second anchor device comprises a second part of the third message.

9. The method according to claim 1, further comprising:
measuring the distance between the mobile device and the first anchor device; and/or
measuring the distance between the mobile device and the second anchor device.

10. The method according to claim 1,
wherein the ranging-capable physical layer communication is an ultra-wide band, UWB, communication.

11. A system for transmitting a payload over a ranging-capable physical layer communication, the system comprising:
a mobile device;
a first anchor device associated with a payload target device;
a second anchor device associated with the payload target device;
the mobile device configured to transmit a first message to the first anchor device and to the second anchor device, wherein the first message comprises a synchronization protocol, wherein the synchronization protocol comprises information and/or commands for establishing a synchronization for establishing time slots for transmitting messages by the plurality of anchor devices, and the mobile device is configured to transmit a second message to the first anchor device and/or to the second anchor device, wherein the second message comprises a mobile device payload;
wherein each of the first and second anchor devices is configured to establish, upon receiving the first message, a first time slot for the first anchor device and a second time slot for the second anchor device based on the synchronization protocol, and wherein the first anchor device is configured to transmit a third message to the mobile device during the first time slot, the third message comprising a target device payload for the payload target device, the second anchor device is configured to transmit the third message comprising the target device payload to the mobile device during the second time slot, and wherein testing based on received messages, by a control unit, if the ranging-capable physical layer communication of the first anchor device and/or the second anchor device fulfills a control unit quality criterion, and not transmitting, if the ranging-capable physical layer communication to the first anchor device and/or the second anchor device does not fulfill the control unit quality criterion, reply message by the control unit to the first anchor device and/or the second anchor device.

12. The system according to claim 11, wherein the mobile device is at least one of the group consisting of a mobile phone, a tag, a token, a key, a keyfob, a smart card.

13. The system according to claim 11, wherein the payload target device is at least one of the group consisting of a car, a door, a transaction terminal, a transit gate.

14. The system according to claim 11, wherein the ranging-capable physical layer communication is an ultra-wide band, UWB, communication.

* * * * *